US010297097B2

(12) United States Patent
Mottla et al.

(10) Patent No.: US 10,297,097 B2
(45) Date of Patent: May 21, 2019

(54) MOBILE DEVICE APPLICATION FOR COMMUNICATING WITH VEHICLES

(75) Inventors: Lesley Mottla, Rockport, MA (US); Douglas Williams, Acton, MA (US); Jonathan Eric Wolfe, Pasadena, CA (US); Gregory Ramsperger, Somerville, MA (US); David J. Goldman, North Andover, MA (US); Syed Naveed Ghalib, Revere, MA (US); Lisa Rigano, Boston, MA (US); Lucas P. Schneider, Bethesda, MD (US)

(73) Assignee: ZIPCAR, INC., Boston, MA (US)

( * ) Notice: Subject to any disclaimer, the term of this patent is extended or adjusted under 35 U.S.C. 154(b) by 95 days.

(21) Appl. No.: 12/796,574

(22) Filed: Jun. 8, 2010

(65) Prior Publication Data
US 2011/0060480 A1 Mar. 10, 2011

Related U.S. Application Data

(60) Provisional application No. 61/185,058, filed on Jun. 8, 2009.

(51) Int. Cl.
G07C 9/00 (2006.01)
G06Q 10/02 (2012.01)
G07B 15/00 (2011.01)

(52) U.S. Cl.
CPC ......... G07C 9/00571 (2013.01); G06Q 10/02 (2013.01); G07C 9/00309 (2013.01); G07B 15/00 (2013.01); G07C 2009/00507 (2013.01)

(58) Field of Classification Search
CPC ............ G07C 9/00571; G07C 9/00309; G07C 15/00; G07C 2009/00507; G06Q 10/02

(Continued)

(56) References Cited

U.S. PATENT DOCUMENTS 6,094,640 A * 7/2000 Goheen ............................. 705/5
6,262,656 B1 * 7/2001 Byrd et al. ............... 340/426.21
(Continued)

FOREIGN PATENT DOCUMENTS

JP 2001288940 A 10/2001
JP 2002/175589 A 6/2002
(Continued)

OTHER PUBLICATIONS http://www.fquick.com/blog/Delphi_Remote-Control_Your_Car_with_an_iPhone_/1108, accessed Mar. 19, 2018, published 2008.*
(Continued)

Primary Examiner — Krishnan Ramesh
(74) Attorney, Agent, or Firm — Wayne Edward Ramage; Baker Donelson

(57) ABSTRACT

Methods, systems, and devices for reserving a reservable asset using a mobile device. A mobile device communicates directly with a vehicle-associated control module or through a reservation server using either a TCP/IP communications channel or near-field communications. A member enters a request using the user interface provided by the mobile-device application. The identity of the member is validated the vehicle-associated control module executes the request by sending a signal to a computer or sensor in the vehicle through the vehicle wiring or the vehicle CANbus. The request can be a function, such as unlocking the vehicle doors, illuminating the interior or exterior lights, honking the horn, or activating a panic alarm.

20 Claims, 7 Drawing Sheets

(58) Field of Classification Search
USPC .................................................... 701/409, 2
See application file for complete search history.

(56) References Cited

U.S. PATENT DOCUMENTS

| | | | |
|---|---|---|---|
| 6,731,625 B1* | 5/2004 | Eastep et al. ................. 370/352 |
| 6,850,153 B1* | 2/2005 | Murakami .......... B60L 11/1816 |
| | | | 235/384 |
| 6,931,308 B2* | 8/2005 | Read ................................ 701/1 |
| 7,146,129 B2 | 12/2006 | Bostrom et al. |
| 7,219,076 B1 | 5/2007 | Racine |
| 7,228,122 B2* | 6/2007 | Oyagi et al. .................. 455/411 |
| 7,366,677 B1* | 4/2008 | Liu et al. ........................ 705/5 |
| 7,425,886 B2* | 9/2008 | Yoshii et al. ................ 340/5.72 |
| 7,567,864 B2* | 7/2009 | Ziehr et al. .................... 701/49 |
| 2002/0186144 A1* | 12/2002 | Meunier ................. 340/825.28 |
| 2003/0033175 A1 | 2/2003 | Ogura et al. |
| 2003/0034873 A1* | 2/2003 | Chase et al. ................. 340/5.2 |
| 2004/0006498 A1* | 1/2004 | Ohtake et al. .................... 705/5 |
| 2004/0010338 A1* | 1/2004 | Ogura et al. ................. 700/214 |
| 2004/0054561 A1* | 3/2004 | Ogura et al. ...................... 705/5 |
| 2004/0073447 A1* | 4/2004 | Stuart et al. ...................... 705/1 |
| 2004/0242198 A1* | 12/2004 | Oyagi et al. .................. 455/411 |
| 2005/0001028 A1* | 1/2005 | Zuili ............................. 235/382 |
| 2005/0144048 A1* | 6/2005 | Belanger ................ G06Q 10/02 |
| | | | 705/5 |
| 2005/0197174 A1* | 9/2005 | Hasan et al. ................ 455/575.9 |
| 2006/0012462 A1* | 1/2006 | Teshima et al. ............. 340/5.61 |
| 2006/0103240 A1* | 5/2006 | Naito et al. ................. 307/10.1 |
| 2006/0265117 A1* | 11/2006 | Cahoon ......................... 701/114 |
| 2006/0279401 A1* | 12/2006 | Yoshii et al. ................ 340/5.61 |
| 2007/0047816 A1* | 3/2007 | Graham et al. ................ 382/181 |
| 2007/0197194 A1* | 8/2007 | Oyagi et al. .................. 455/411 |
| 2007/0198311 A1* | 8/2007 | Menendez et al. ............... 705/5 |
| 2007/0219076 A1 | 9/2007 | Axelrod |
| 2007/0285209 A1* | 12/2007 | Heusi et al. ................. 340/5.23 |
| 2007/0294116 A1* | 12/2007 | Stephens et al. .................... 705/5 |
| 2008/0097798 A1* | 4/2008 | DeVallance et al. ............. 705/5 |
| 2008/0200209 A1* | 8/2008 | Cahoon ......................... 455/557 |
| 2009/0144151 A1* | 6/2009 | Pajot ............................. 705/14 |
| 2009/0177336 A1* | 7/2009 | McClellan .......... B60R 25/2018 |
| | | | 701/2 |
| 2009/0258642 A1* | 10/2009 | Golenski .................... 455/426.1 |
| 2009/0265251 A1* | 10/2009 | Dunlap et al. .................. 705/26 |
| 2010/0078475 A1* | 4/2010 | Lin et al. ....................... 235/380 |
| 2010/0241857 A1 | 9/2010 | Okude et al. |
| 2011/0009098 A1* | 1/2011 | Kong ......................... 455/414.1 |
| 2011/0060480 A1* | 3/2011 | Mottla et al. ..................... 701/2 |
| 2011/0191126 A1* | 8/2011 | Hampshire et al. ............. 705/5 |
| 2014/0156111 A1* | 6/2014 | Ehrman ............................ 701/2 |

FOREIGN PATENT DOCUMENTS

| | | |
|---|---|---|
| JP | 2002342878 A | 11/2002 |
| JP | 2003041821 A | 2/2003 |
| JP | 2003/067884 A | 3/2003 |
| JP | 2003233892 A | 8/2003 |
| JP | 2004/178385 A | 6/2004 |
| JP | 2004192126 A | 7/2004 |
| JP | 2007183749 A | 7/2007 |
| JP | 2009123059 A | 6/2009 |
| WO | WO-2007/038839 A1 | 4/2007 |

OTHER PUBLICATIONS

International Search Report and Written Opinion for International Application No. PCT/US2010/037826 dated Oct. 8, 2010. 11 pages.

* cited by examiner

MOBILE DEVICE APPLICATION FOR COMMUNICATING WITH VEHICLES

CROSS-REFERENCE TO RELATED APPLICATION

This application claims the benefit of U.S. Provisional Patent Application No. 61/185,058, filed Jun. 8, 2009, which is hereby incorporated by reference herein in its entirety.

FIELD OF THE INVENTION

The present invention relates generally to using a mobile device to communicate with reservable assets, such as a vehicle in a car-sharing service.

DESCRIPTION OF THE BACKGROUND ART

In the past, mobile devices were used for a single purpose, or a limited set of purposes: for example, mobile devices would be used to make or receive telephone calls or to send text messages, but little more. Today, mobile device users use these devices to shop, locate directions, send two-way text communications, and for social networking. Increasingly, users run on their mobile devices dedicated mobile device applications for their favorite merchants, search engines, and social networking sites to complete transactions, find information, and communicate with others, respectively.

Systems that provide for the shared-use of vehicles are very much in demand, particularly in urban settings. Vehicle fleets have become very popular in the public and private sectors. The shared use of vehicles allows the government and companies to save money, reduce risk, and promote sustainability. Consumers also find the ability to access vehicles on an as-needed basis, without the downsides of paying to own, finding parking for, and maintaining a vehicle, appealing. Vehicle sharing is simple, convenient, economically friendly, and cost effective. For a consumer vehicle fleet service, a user simply joins a service, reserves a vehicle over the phone or over the interne using a web browser, and gains access to the vehicle after sending payment and receiving an access card. However, because an access card must be sent in the mail or picked up at a service location, it may not be possible to join the service and rent a car on the same day. Further, even once a user becomes a member and receives an access card, the member must have the access card in hand to unlock and drive a reserved vehicle. Without the access card, the member cannot gain access to the vehicle that he or she has reserved. Therefore, there exists a need for members of a car-sharing service to be able to locate, reserve, and access vehicles with a single, streamlined application using something few leave home without—a mobile device.

SUMMARY OF THE INVENTION

Disclosed herein are methods, systems, and devices configured for using a mobile device for reserving, accessing, and locating a reservable asset. The mobile device can be used to reserve, access, and locate a reservable vehicle in a car-sharing service.

A mobile device running a mobile-device application is used by a member of a car-sharing service to reserve a vehicle. The application can be run on a mobile device a variety of ways, such as an application installed on the mobile device or a web application. The application shows the reservable assets at a particular location, and displays the types and current availability of the reservable vehicles. To reserve a vehicle, the member inputs information using the mobile device to specify the type of vehicle, date and time for the reservation, and the desired rental location. The mobile device sends this information to a reservation server for the car-sharing service, and the reservation server sends to the mobile device information regarding vehicles that match the input criteria. Once the desired vehicle, reservation time, and location are chosen, the member can confirm the selection and submit payment to complete the reservation.

Once a vehicle is reserved, the member can gain access to the vehicle using the mobile device. The member can use the mobile device application to lock, unlock, and sound the horn of a reserved vehicle. The member can communicate with the vehicle through the reservation server using a transport control protocol and internet protocol (TCP/IP) communications channel. The member can also communicate with the vehicle through a vehicle-associated control module using near-field communication, Bluetooth standards, or other short-range wireless or audio communication standards. After communication is established, the reservation server verifies the member identification number and reservation state, and the request of a member for access to the vehicle or for the vehicle to make an audible or visual signal, is granted.

The mobile device application features an embedded map system that, when used with global positioning system (GPS), is capable of displaying reservable assets, such as vehicles, and their physical location in relation to the mobile device or a designated landmark. Alternatively, the cellular-site position of the mobile device is used to locate and display reservable assets and their physical location in relation to the mobile device or a designated landmark.

Further, the mobile device application is capable of sending alerts and reminders to be displayed on the mobile device using push-notification technology. The mobile device application also enables mobile-device initiated communication using voice, text, instant message, or email communications, so that members can contact reservation agents to make or change reservations, or discuss questions or concerns related to the car-sharing service.

BRIEF DESCRIPTION OF DRAWINGS

The foregoing and other objects of the methods and devices disclosed herein, the various features thereof, as well as the invention itself, may be more fully understood from the following description, when read together with the accompanying drawings in which.

DETAILED DESCRIPTION

Disclosed herein are methods, systems, and devices for sharing reservable assets using a mobile device 100. The reservable asset can be a vehicle 104. In another embodiment, the reservable asset is a relatively scarce resource that can be allocated for use by a large pool of users. One of ordinary skill in the relevant art should understand that other configurations and embodiments of the present invention are possible, without compromising the integrity of the underlying invention.

Figure 3:
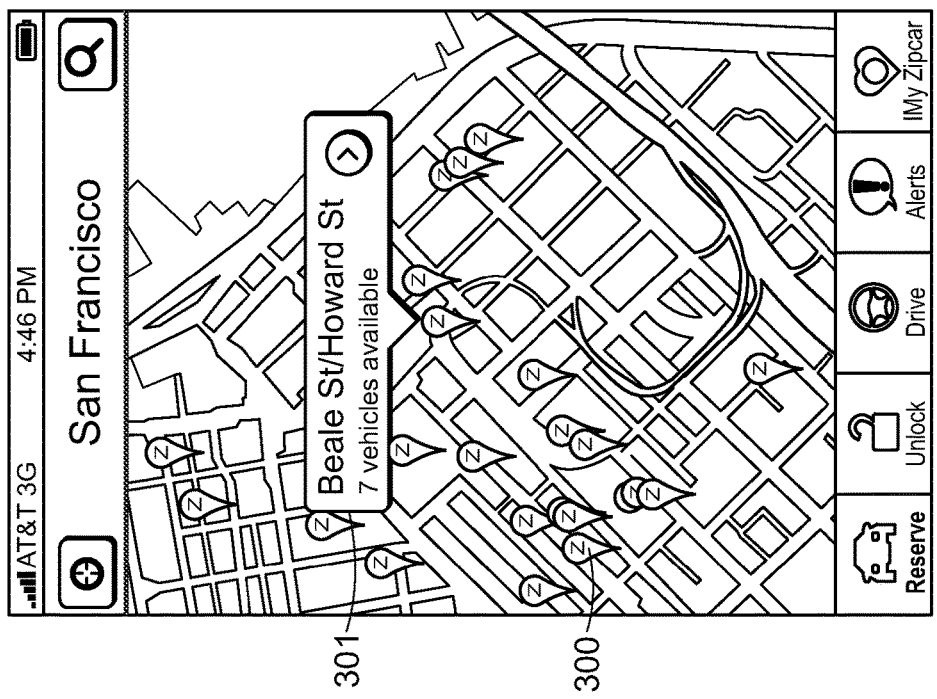
FIG. 3 conceptually illustrates a portion of the user interface for displaying vehicle locations and the number of vehicles available at a particular location.
Figure 2:
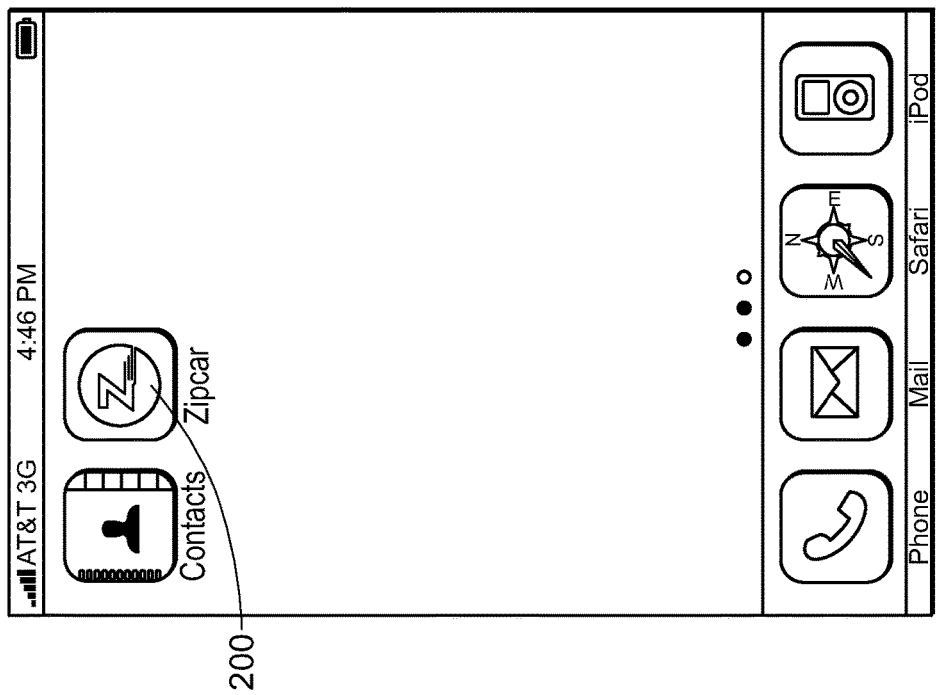
FIG. 2 conceptually illustrates an icon that represents the mobile device application on a mobile device.

Disclosed is a method of, system for, or a mobile device 100 capable of, reserving and accessing a reservable asset, which comprises a mobile device 100 running a mobile device application 200, as shown in FIG. 2. The mobile device application 200 can be installed on the mobile device 100 or it can be accessed through a web application. The mobile device 100 is capable of communicating with a reservation server 101 that manages information related to the sharing of reservable assets. The reservation server 101, which is in direct communication with a reservation database 102, provides to the mobile device 100 information regarding available reservable assets, and identifies at least one available reservable asset and its location when a reservable asset is available to reserve. The mobile device 100 receives the information regarding the reservable assets that are available and the location where at least one of the available assets may be found. The mobile device 100 displays this information, as shown in FIG. 3.

The mobile device application has an embedded map system that is capable of displaying locations of reservable assets on a mobile device 100. In a preferred embodiment, the embedded map system is a map application programming interface (API) that is commercially available from Apple Inc. at http://developer.apple.com. Using the embedded map system, members are able to search, pan, and zoom to find locations of available reservable assets. Members can search for locations that are nearby, in a designated city, or anywhere in the world. The embedded map system can display locations of vehicles available for use in a car-sharing service. Mobile devices with GPS capabilities use the embedded map to locate and display vehicles that are nearest to the mobile device 100 or a designated landmark. In another embodiment, the application uses the location of the mobile device 100 according to its cellular-site position to locate and display vehicles that are nearest to the mobile device 100 or a designated landmark. The mobile device application can display available reservable assets based on the assets' location within a requested block, city, state, or radius from a designated landmark. The mobile device application is also capable of providing turn-by-turn directions using the embedded map system. The turn-by-turn directions can be optimized for walking or driving directions.

Figure 5:
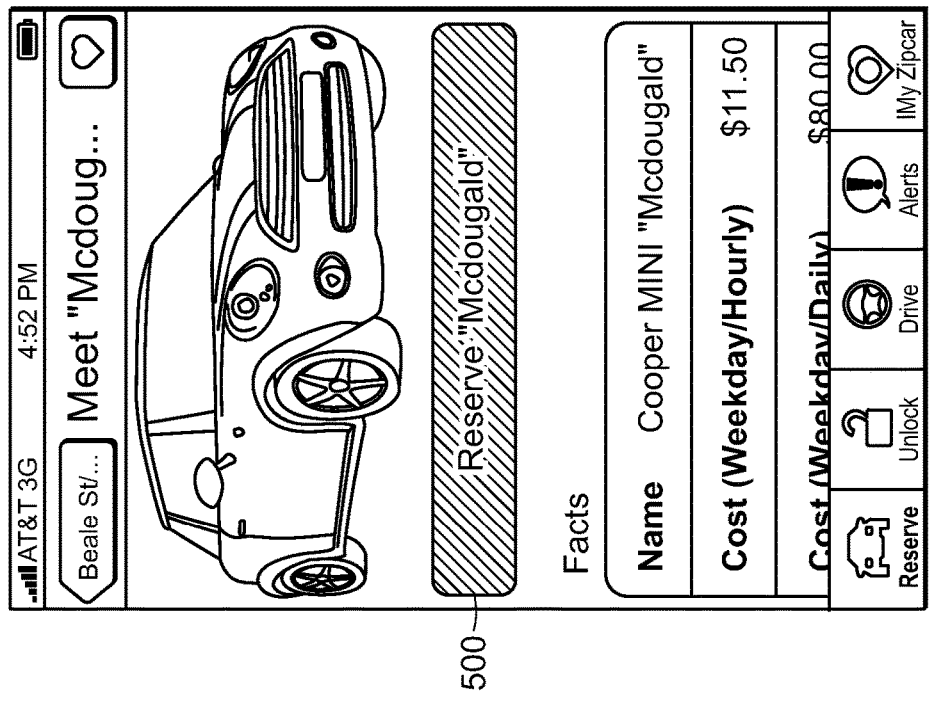
FIG. 5 conceptually illustrates a portion of the user interface for displaying information regarding a selected vehicle.
Figure 4:
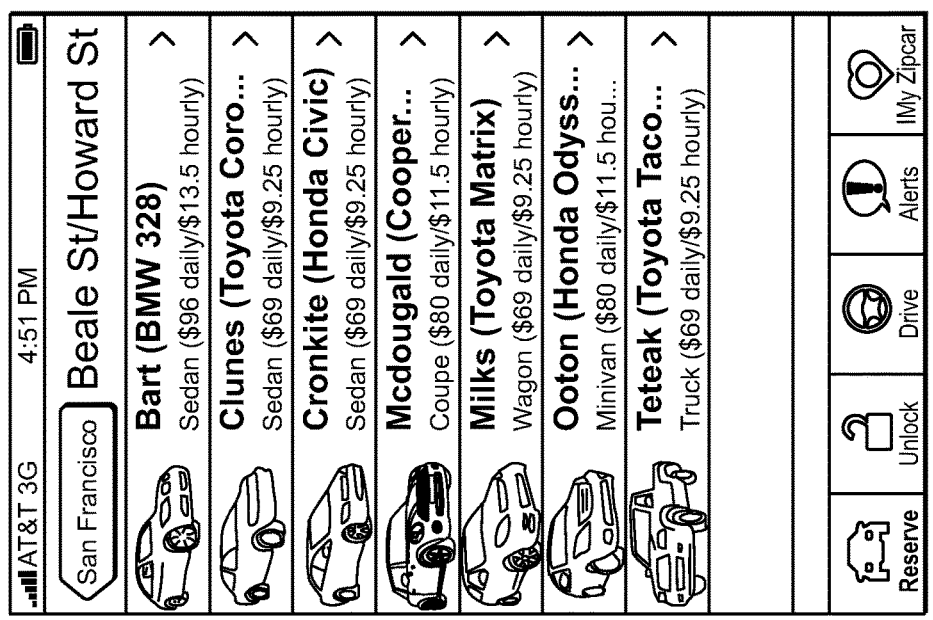
FIG. 4 conceptually illustrates a portion of the user interface for displaying information regarding the vehicles available at a selected location.

Referring to FIG. 4, the mobile device application 200 shows the reservable assets at a particular location, and indicates the type of reservable asset, which are currently reservable, and which have already been reserved. In one embodiment, the available reservable assets are vehicles 104 that are identified on the mobile device display in a list. The vehicles 104 or other reservable assets may also be identified on the mobile device display by pins 300 as shown in FIG. 3 or any other icons capable of indicating the location of available reservable assets on an embedded map system. The member can select the location of an available reservable asset on the embedded map system, and the mobile device application 200 will display a dialog box 301 with the number of reservable assets available at the selected location. Selections can be made within the mobile device application 200 by tapping, clicking, or pushing a button, screen, or wheel, or by speaking the selection, depending on the selection options provided by the mobile device 100. The member can select the dialog box 301 to display a list of the available reservable assets. In one embodiment, the list comprises information related to the available vehicles, such as make, model, vehicle type, and rental rate, as shown in FIG. 4. The list can also show vehicle amenities, including, but not limited to, trunk size, the number of passengers it accommodates, types of plugs and adapters, compatibility with or docks for devices such as mp3 players, and fuel economy. The member can select one or more of the reservable assets by selecting a button 500 on the mobile device 100, as shown in FIG. 5.

Figure 7:
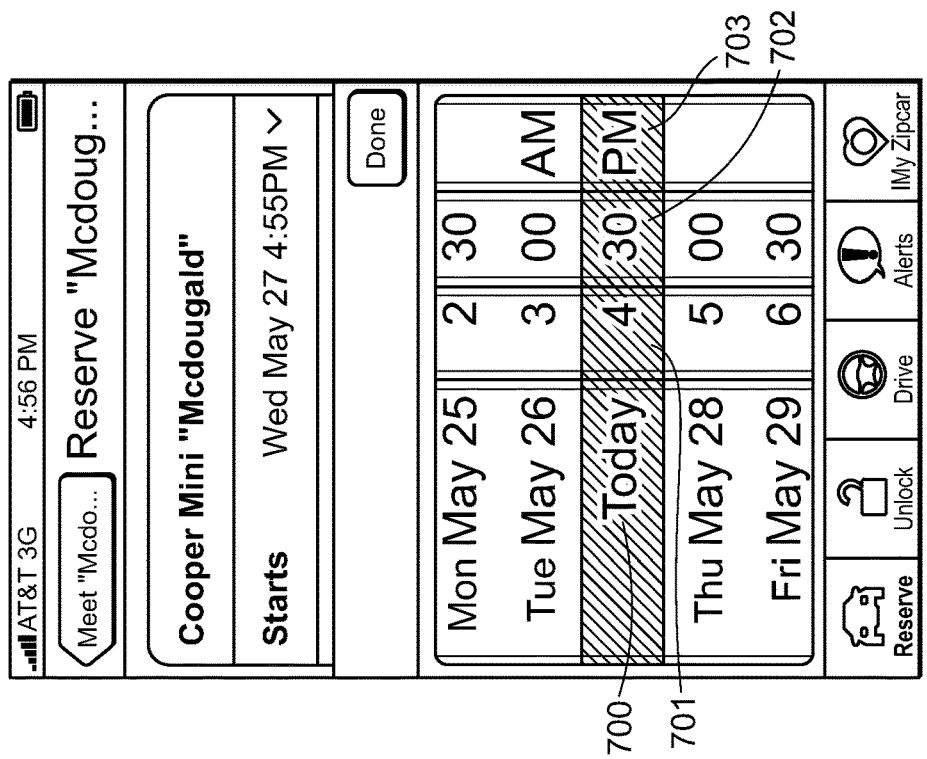
FIG. 7 conceptually illustrates a portion of the user interface for entering the date on which a reservation is to take place.
Figure 6:
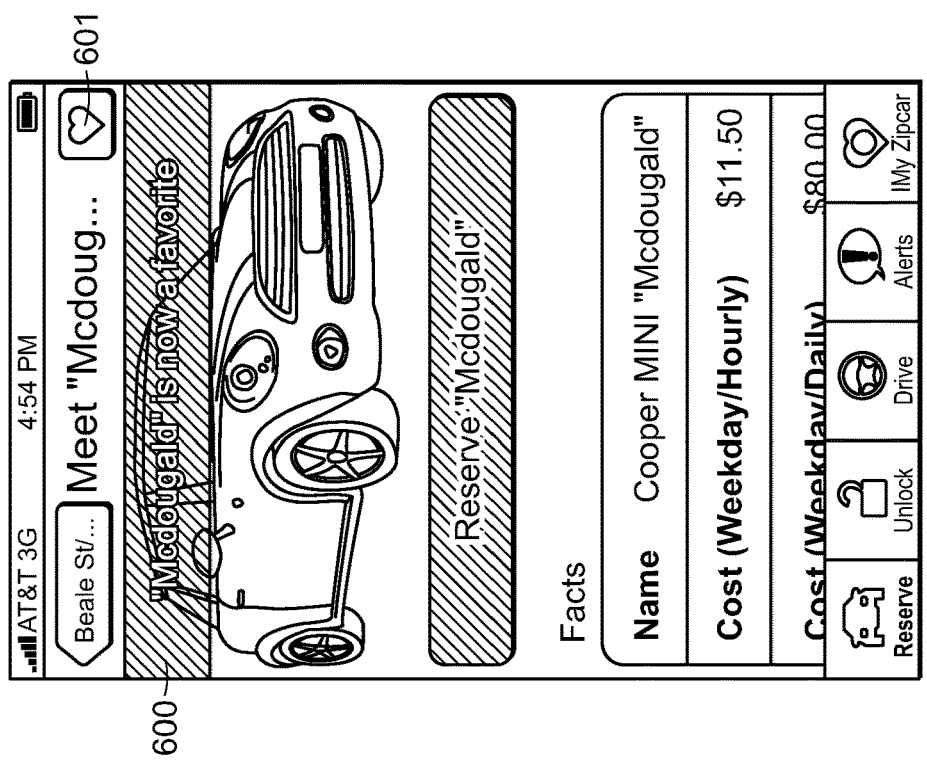
FIG. 6 conceptually illustrates a portion of the user interface for displaying a vehicle marked by a member as a favorite vehicle.
Figure 8:
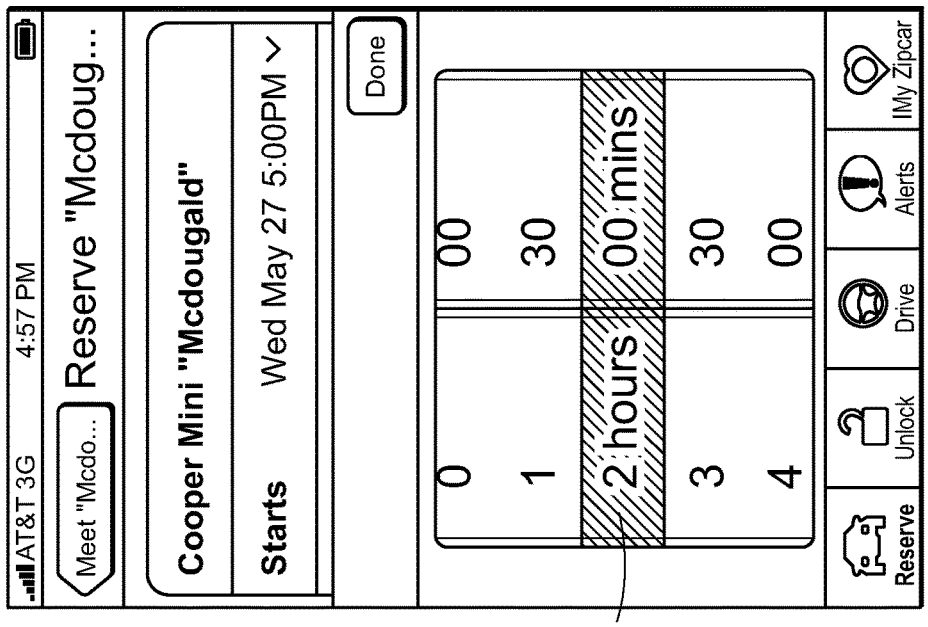
FIG. 8 conceptually illustrates a portion of the user interface for entering the time and duration for a reservation.
Figure 11:
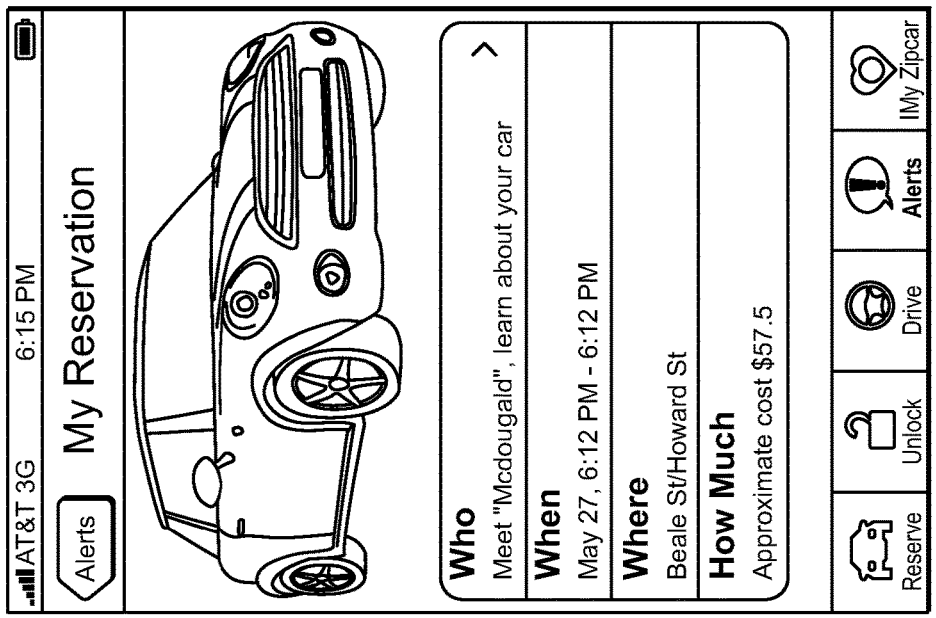
FIG. 11 conceptually illustrates a portion of the user interface for displaying an alert for notifying a member of the reservation time.
Figure 13:
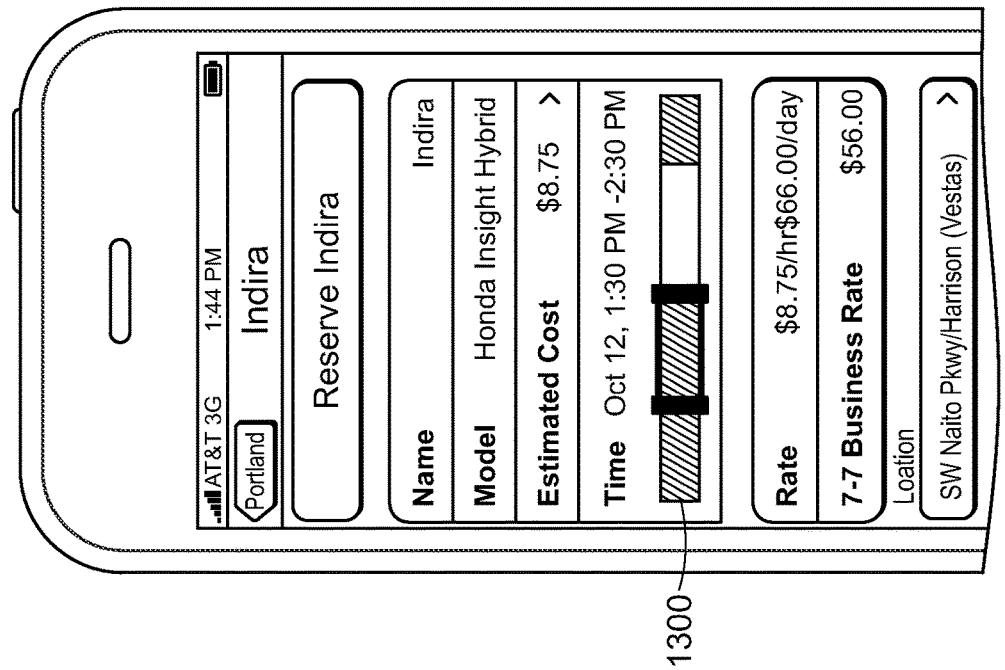
FIG. 13 conceptually illustrates a portion of the user interface for displaying a slider timeline for selecting a reservation time.

A member can optionally mark a reservable asset type as a favorite 600, so that the member can search for available reservable assets of the same type in the future. Favorites can be recalled by selecting a button 601 that causes the mobile device application 200 to display a list of reservable assets that have been designated by the member as favorites 600, as shown in FIG. 6. The member can secure a reservable asset for a particular time by designating the date 700 and time by selecting the hour 701, minute 702, a.m. or p.m. 703, and duration 800 of the reservation, as shown in FIGS. 7 and 8. The member can also secure a reservable asset for a particular time by designating the date and time using a slider 1300 as shown in FIG. 13. The slider 1300 is a timeline on which the member can slide to select a time for reserving the asset. The slider 1300 indicates dates and times during which the reservable asset is available and optionally the dates and times during with the reservable asset is not available. The slider 1300 can be a bar, line, or any shape or marking that conceptualizes time. The slider 1300 can be segmented using linear demarcations, shading, or different colors to indicate segments of time, such as fractions of an hour.

Figure 9:
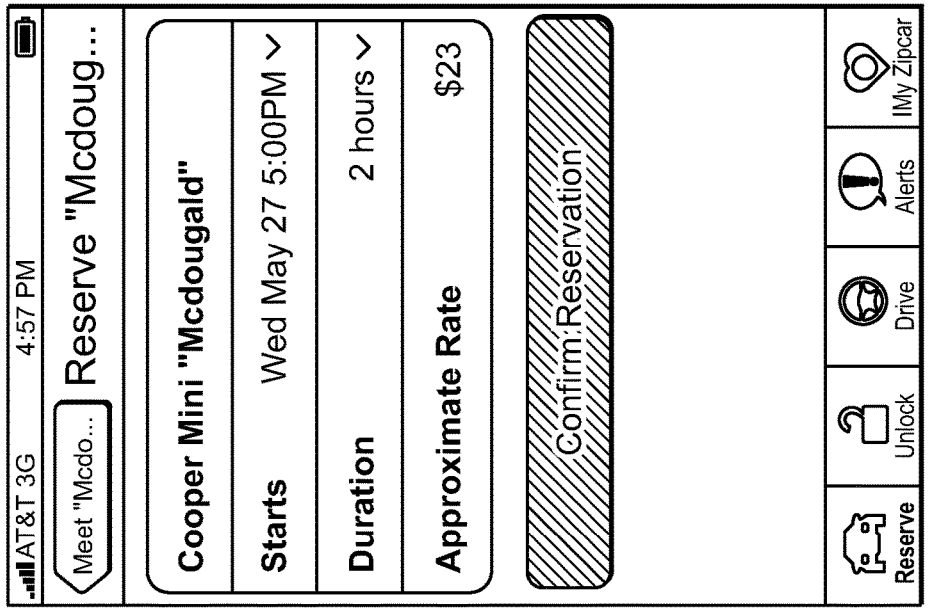
FIG. 9 conceptually illustrates a portion of the user interface for confirming the selected vehicle, start date, start time, duration, and rental rate for a reservation.
Figure 10:
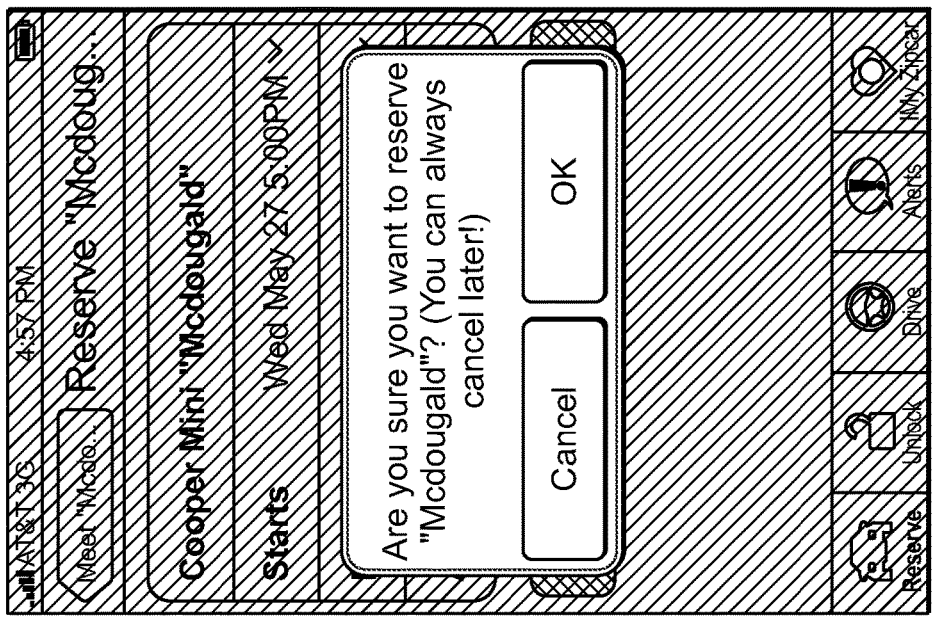
FIG. 10 conceptually illustrates a portion of the user interface for displaying a prompt for confirming the reservation.

A unique identifier and payment information are also provided by the member or mobile device 100 to the reservation server 101. The reservation server 101 receives the information regarding the selected reservable asset, the unique identifier, and payment information, and sends to the mobile device 100 a request for confirmation and completion of the transaction. The mobile device 100 receives the request for confirmation, as shown in FIG. 9. The member confirms the transaction using a user interface such as that shown in FIG. 10, and the information is sent to, and received by, the reservation server 101.

Reservations can be placed and verified using a unique identifier that is provided to the reservation server 101 by the member or the mobile device 100. The unique identifier may be implemented by a variety of means, including a password or a personal identification number. The unique identifier can be the serial number for the mobile device 100 or a personal identification number that is assigned to each member to allow secure access to the reservation system. Identity can be verified using information stored by the vehicle-associated control module 103 or by the reservation server 101. The information verified can be a unique identifier entered by the member, a unique identifier provided by the reservation server 101, a unique identifier provided by the mobile device 100, or a unique identifier stored by the reservation server 101 or the vehicle-associated control module 103.

The member can use the mobile device 100 to request access to the reservable asset. The request is sent to the reservation server 101 or the vehicle-associated control module 103 where the unique identifier belonging to the member or the mobile device 100 used to make the reservation is compared to the unique identifier belonging to the member or the mobile device 100 requesting access. The vehicle-associated control module 103 is a telematics system for automotive communication, and is well known in the industry. The vehicle-associated control module 103 is located in or on the vehicle and interfaces with wiring, computers and/or sensors in the vehicle. When the unique identifiers match, the reservation server 101 sends information in a preferred embodiment over a cellular data network to a vehicle-associated control module 103, which interacts with the locking mechanism of the vehicle 104 to allow access to the reservable asset.

A method for, or device capable of, identifying the location of a reserved asset using an audible or visual signal or making the reserved asset perform an action, is also disclosed. To identify the location of a reserved asset, a member uses a mobile device 100 to request that the reservable asset make or display a visual or audible signal capable of allowing the member to locate it. The request is sent to the reservation server 101 or vehicle-associated control module 103 where the unique identifier belonging to the member or the mobile device 100 used to make the reservation is compared to the unique identifier belonging to the member or the mobile device 100 making the request for identification of the location of the reserved asset. When the unique identifiers match, the vehicle-associated control module 103 causes the reserved asset to make the requested audible or visual signal. If communication with the reserved asset is through the reservation server 101, the server 101 sends information to a vehicle-associated control module 103, which causes the reserved asset to make the requested audible or visual signal. Once authorization is received by the vehicle-associated control module 103, the selected reservable asset makes or displays the requested visual or audible signal. In a preferred embodiment, the signal is the honk of the vehicle horn. In other embodiments, the action or audible or visual signal is the illumination of the interior or exterior lights of a vehicle, the opening of a trunk, the remote starting a vehicle engine, sounding a vehicle panic alarm, sounding a vehicle security alarm, unlocking doors, locking doors, opening the vehicle windows, or closing the vehicle windows.

Figure 12:
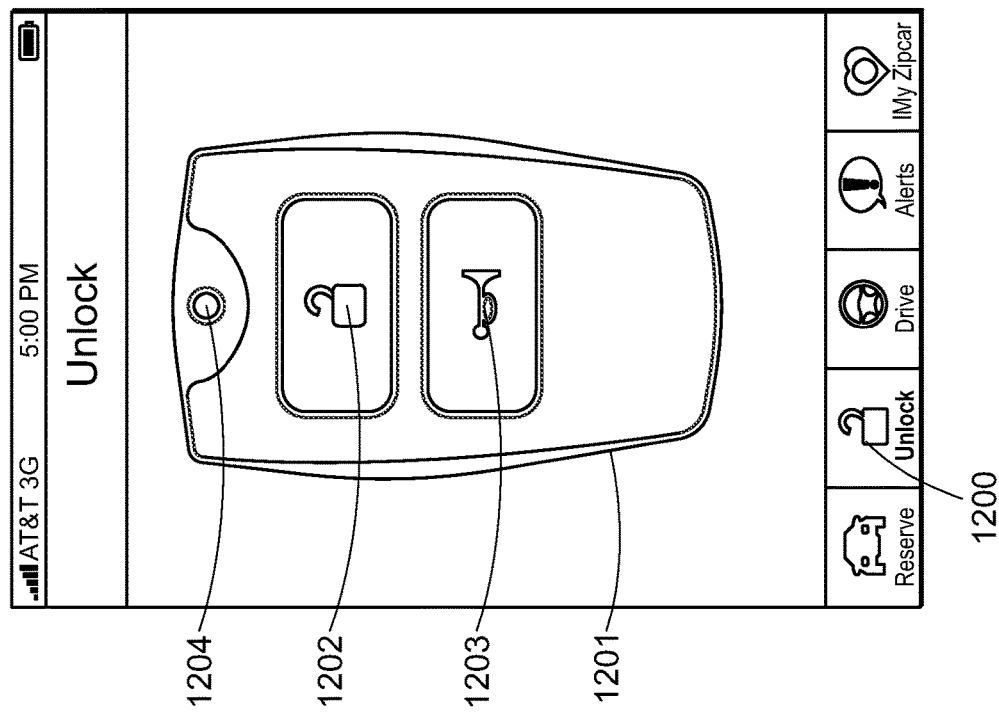
FIG. 12 conceptually illustrates a portion of the user interface for displaying an icon for unlocking a vehicle or for making a vehicle sound its horn.

FIG. 12 conceptually illustrates one embodiment of the method for using a mobile device 100 to gain access to, or identify the location of, a vehicle 104. In this embodiment, a member selects an unlock icon 1200 that causes the mobile device application 200 to display a key-fob icon 1201 that has options for locking or unlocking 1202 the vehicle 104. The icon that controls the lock/unlock function can be any shape or configuration that can be selected to control the locking mechanism or horn for the vehicle 104. In one embodiment, a member selects a lock icon 1200 that causes the mobile device application to display a user interface with another icon 1201 that has a button 1203 for causing a vehicle 104 to sound its horn, or button or buttons 1202 to lock or unlock the vehicle doors. Optionally, a light indicator 1204 on the key-fob icon 1201 illuminates to indicate that a button has been selected. In another embodiment, when a button on the key-fob icon 1201 is selected, the mobile device application causes the mobile device 100 to make an audible sound. The sound may be a chirp, click, tune, bell, horn, or any sound capable of alerting the member that a button on the key-fob icon 1201 has been selected.

Figure 1:
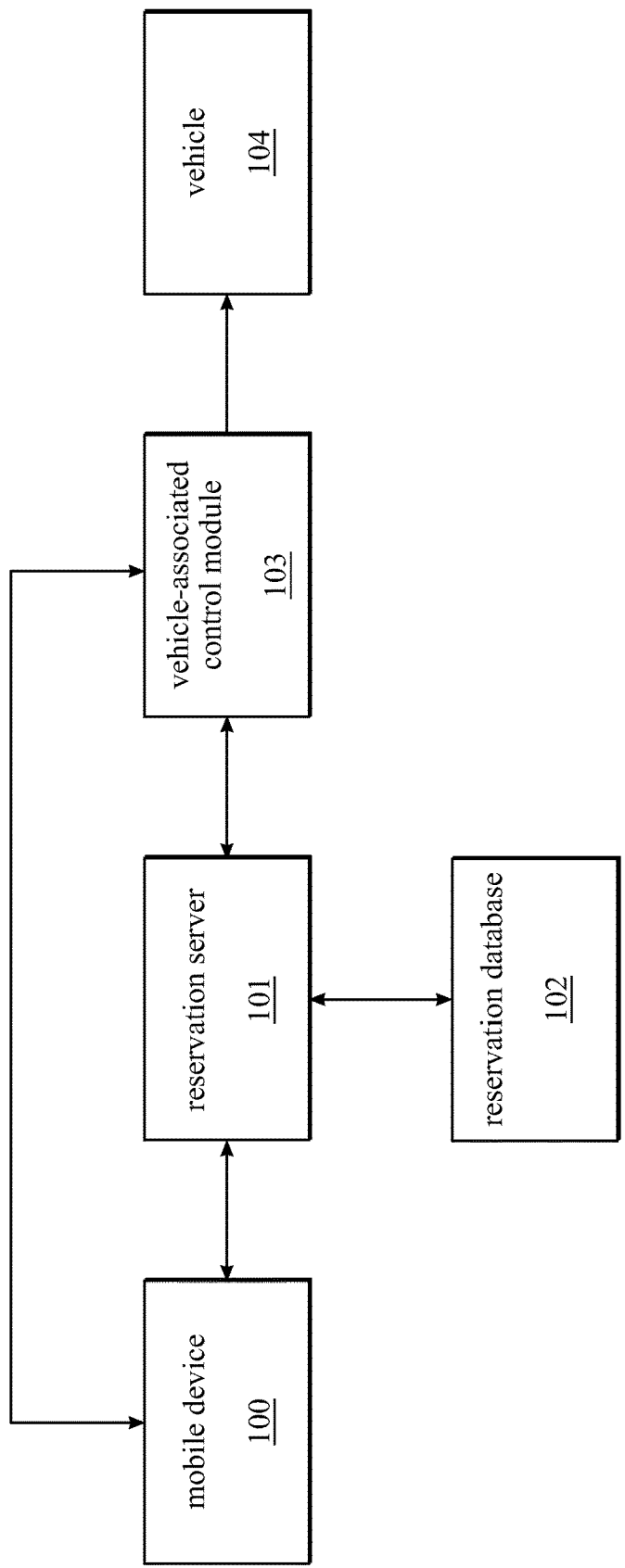
FIG. 1 illustrates the system architecture of a mobile device used to communicate with a vehicle.

In one embodiment, the mobile device 100 and reservation server 101 communicate using a transport control protocol and internet protocol (TCP/IP) communications channel. In another embodiment, the mobile device 100 communicates directly with the vehicle 104 by way of the vehicle-associated control module 103 using short-range wireless communication capabilities, such as those provided by near-field communication standards, as shown in FIG. 1. In yet another embodiment, the mobile device 100 communicates directly with the vehicle 104 by way of the vehicle-associated control module 103 using short-range wireless or audio communication capabilities, such as those provided by the Bluetooth standard.

A user enters a request on the mobile device 100, which is associated with a function code that tells the vehicle which action to perform, and the mobile device 100 communicates with the reservation server 101 and the reservation server 101 receives the communication from the mobile device 100. For communications initiated using a TCP/IP communications channel, the reservation server 101 validates the identity of the user. Once identity has been validated, the reservation server 101 communicates the function code associated with the request to the vehicle-associated control module 103 over a network, such as a cellular network. The vehicle-associated control module 103 receives notification from the reservation server 101 that identity has been validated. The vehicle-associated control module 103 executes the request by interfacing with analog (wiring) or digital circuitry (e.g. vehicle CANbus) circuitry in the vehicle to control computers, sensors, and motors in the vehicle using techniques that are well known in the art. For communications initiated using short-field communications, the member enters a request and the reservation server 101 validates the identity of the member. The mobile device 100 sends the function code associated with the request directly to the vehicle-associated control module 103 through a near-field communication modem, near-field communication host, or Bluetooth host, and the vehicle-associated control module 103 executes the request. The action can be locking or unlocking the vehicle doors, illuminating the interior or exterior lights, honking the horn, sounding a panic alarm, sounding a security alarm, etc.

For digital communication, in a preferred embodiment the vehicle-associated control module 103 interfaces with the vehicle CANbus to execute requests. The CANbus carries signals to a computer or sensor in the vehicle, which performs the requested function. Alternately, for analog communication, the vehicle-associated control module 103 can execute requests by sending signals through the wiring in a vehicle. Both analog and digital communication techniques are well known in the industry. Computers, sensors, or motors on the vehicle can be used to control several functions, such as locking and unlocking doors, illuminating the interior and exterior of a vehicle, honking the horn, engaging the security or panic alarm, and opening or closing windows. To lock or unlock a vehicle door, the member requests that the doors lock or unlock. The request is sent directly to the vehicle-associated control module 103 or the reservation server 101. For signals received by the reservation server 101, the signal is sent to the vehicle-associated control module 103. Once the signal is received by the vehicle-associated control module 103, the signal is sent to and received by the vehicle computer by way of wires or the vehicle CANbus. The vehicle computer turns a switch on or off to provide power to the vehicle's actuator that unlocks or locks the doors. To honk the horn, the member requests that the horn honk. The vehicle-associated control module 101 sends the vehicle computer the signal to honk the horn. The vehicle receives the signal, and, depending on the vehicle model, the horn receives the signal using high-voltage-low-voltage signals, signals to turn on and off switches controlling the horn, or via hardware added to communicate with the horn.

The mobile device application 200 is capable of receiving and displaying messages, such as alerts and reminders. The messages are sent to the mobile device 100 using push notifications, where a push notification is a notification sent by the reservation server 101 to the mobile device 100 when the reservation server 101 detects that a message is destined for a message store on the mobile device 100. The notification can be either a User Datagram Protocol (UDP) message or a notification sent using the Short Message Service (SMS) standard. In the former case, the mobile device 100 is connected to an internet protocol network to receive the notifications. In the latter case, the mobile device 100 is capable of receiving an SMS message and is connected to a mobile network to receive the notifications. Messages can be pushed to the mobile device 100 from the reservation server 101, allowing the mobile device application 200 to implement message-driven logic. The reservation server 101 has the ability to detect when messages are available or staged on the server and are available for delivery to the mobile device. When a message is available, the reservation server 101 initiates contact with the mobile device 100 and synchronizes the message down to the mobile device application.

The mobile device application can request messages, such as alerts and reminders, using pull technology. The requests can be made by the mobile device 100 automatically, at timed intervals. The requests can also be made to the reservation server 101 by a member when the member provides to the reservation server 101 the required input using the mobile device 100. The messages can be used to report gasoline levels, alert the member about reservation start and end times, send promotional material to members, confirm reservations, and to provide billing and payment information.

The mobile device application 200 is capable of initiating contact with a reservation agent. By directly contacting a reservation agent, the member can make changes to an existing reservation, establish a reservation, or address questions or concerns related to the car-sharing service. Moreover, a member can contact a reservation agent to report vehicle conditions, such as damage to the vehicle or the vehicle not being clean. The ability to report this information at the beginning of the reservation allows members to avoid being held responsible for poor vehicle conditions when the vehicle is returned.

In one embodiment, the mobile device 100 initiates contact with a reservation agent using a voice connection. When the mobile device 100 receives input from a member to initiate a voice communication, the mobile device application opens a voice connection by automatically dialing a programmed telephone number for a reservation agent. In another embodiment, the mobile device 100 initiates contact with a reservation agent using an SMS message. When the mobile device 100 receives input from a member to initiate an SMS communication with a reservation agent, the mobile device application opens a program for sending SMS messages on the mobile device 100. A telephone number for the reservation agent, which is capable of receiving SMS messages, is automatically placed in the "to" field of the blank message. In another embodiment, the mobile device application 200 can initiate contact with a reservation agent using an instant message feature. The mobile device application also can initiate contact with a reservation agent using email. In still another embodiment, the mobile device application can initiate contact with a reservation agent using push-to-talk technology.

For convenience, certain terms employed in the specification, examples, and appended claims are collected here. Unless defined otherwise, all technical and scientific terms used herein have the same meaning as commonly understood by one of ordinary skill in the art to which this invention belongs. The initial definition provided for a group or term herein applies to that group or term throughout the present specification individually or as part of another group, unless otherwise indicated.

The articles "a" and "an" are used herein to refer to one or to more than one (i.e., to at least one) of the grammatical object of the article. By way of example, "an element" means one element or more than one element.

The term "or" is used herein to mean, and is used interchangeably with, the term "and/or," unless context clearly indicates otherwise.

It is to be understood that while the methods, systems, and devices have been described in conjunction with the detailed description thereof, the foregoing description is intended to illustrate and not limit the scope of the inventions, which is defined by the scope of the appended claims. For example, the shapes of icons or arrangement of the graphical interface can be any shape or arrangement that identifies the object represented, or conveys information for reserving or accessing a vehicle, respectively. Other aspects, advantages, and modifications are within the scope of the following claims.

What is claimed is:

1. A method for managing shared reservable assets, comprising the steps of:

prior to receiving a request to reserve a shared reservable asset, providing, by a first processor of a computing device, for display on a map using a second processor on a mobile computing device, information regarding each of one or more available shared reservable assets which have previously been designated as favorites by a user of the mobile computing device, wherein the information comprises a make, a model, a location, rental or use rate, the number of passengers accommodated, types of plugs or adapters provided, and fuel economy for each of the one or more available shared reservable assets;

receiving, by the first processor, from the second processor in the mobile computing device, a request to reserve a specific shared reservable asset at a user selected location, wherein the request comprises a first identifier associated with a user of the mobile computing device, and the shared reservable asset is a user selected, unique shared reservable asset of the one or more available shared reservable assets;

following acceptance of the request to reserve the specific shared reservable asset, storing, by the first processor in a reservation database, (i) the first identifier and (ii) an indication that the specific shared reservable asset is now a reserved asset, wherein the first identifier is associated with the reserved asset;

displaying, in response to the user of the mobile computing device selecting an unlock icon on the display screen of the mobile computing device, a user interface displaying a key-fob icon on the mobile computing device, said key-fob icon displaying the image of a key-fob with several additional icons displayed within said image, said additional icons comprising a button with an image of a lock for controlling the lock/unlock mechanism for the reserved asset, a button with an image of a horn for controlling the horn of the reserved asset, and a light indicator configured to indicate when one of said buttons is selected;

prior to an attempt to physically access the reserved asset by the user of the mobile computing device, receiving, by the first processor, from the second processor in the mobile computing device, a request to physically access the reserved asset, wherein the request includes a second identifier;

following receipt of the request to physically access the reserved asset, determining, by the first processor, that the second identifier is valid; and sending, by the first processor, over a network, a signal to a third processor in a control module associated with the reserved asset, wherein the control module is configured to interact with a lock associated with the reserved asset to allow physical access to the reserved asset based on the signal from the first processor.

2. The method of claim 1, further comprising the steps of:
receiving, by the first processor, from the second processor in the mobile computing device, a request for information regarding the availability of one or more shared reservable assets, wherein the reserved asset is one of the one or more shared reservable assets; and
receiving, by the first processor, from the reservation database, information responsive to the request for information regarding the availability of the one or more shared reservable assets.

3. The method of claim 1, wherein the reserved asset is a vehicle.

4. The method of claim 3, wherein:
the lock is a driver's side door lock, and
the control module interfaces with at least one of wiring, a computer, and a sensor in the vehicle to control the driver's side door lock.

5. The method of claim 3, wherein:
the mobile computing device is configured to request to control the horn of the vehicle, and
the control module is configured to communicate with the vehicle to control the horn of the vehicle.

6. The method of claim 1, wherein determining the second identifier is valid comprises determining, by the first processor, that the first identifier and the second identifier match.

7. The method of claim 1, wherein each of the first identifier and the second identifier comprises one or more members selected from the group consisting of a password, a personal identification number, and a mobile-device serial number.

8. The method of claim 1, wherein the first and second identifiers are unique identifiers specific to at least one of the user of the mobile computing device and the request to reserve the specific shared reservable asset.

9. The method of claim 8, wherein an application running on the mobile computing device uses the location of the mobile computing device to identify and display one or more available reservable assets nearest to the mobile computing device.

10. A system for managing shared reservable assets, comprising:
a first processor; and
a memory storing instructions that, when executed by the first processor, cause the first processor to:
prior to receiving a request to reserve a shared reservable asset, provide for display on a map using a second processor on a mobile computing device, information regarding each of one or more available shared reservable assets which have previously been designated as favorites by a user of the mobile computing device, wherein the information comprises a make, a model, a location, rental or use rate, the number of passengers accommodated, types of plugs or adapters provided, and fuel economy for each of the one or more available shared reservable assets;
receive a request to reserve a specific shared reservable asset at a user-selected location, wherein the request comprises a first identifier associated with a user of the mobile computing device, and the shared reservable asset is a user-selected, unique reservable shared asset of the one or more available shared reservable assets;
following acceptance of the request to reserve the specific shared reservable asset, store in a reservation database (i) the first identifier and (ii) an indication that the specific shared reservable asset is now a reserved asset, wherein the first identifier is associated with the reserved asset;
displaying, in response to the user of the mobile computing device selecting an unlock icon on the display screen of the mobile computing device, a user interface displaying a key-fob icon on the mobile computing device, said key-fob icon displaying the image of a key-fob with several additional icons displayed within said image, said additional icons comprising a button with an image of a lock for controlling the lock/unlock mechanism for the reserved asset, a button with an image of a horn for controlling the horn of the reserved asset, and a light indicator configured to indicate when one of said buttons is selected;
prior to an attempt to control a function of the reserved asset by the user of the mobile computing device, receive, from the second processor on the mobile computing device, a request to control a function of the reserved asset, wherein the request includes a second identifier;
determine whether the second identifier is valid based at least in part on a comparison of the first identifier and the second identifier; and
following determining the second identifier is valid, send over a network, a signal to a third processor in a control module associated with the reserved asset, wherein:

the signal identifies the function of the reserved asset the mobile computing device requested to control, and the control module is configured to communicate with the reserved asset to cause the reserved asset to perform the requested function.

11. The system of claim 10, wherein the shared reservable asset is a vehicle.

12. The system of claim 11, wherein the requested function is a member selected from the group consisting of honking a horn of the vehicle, illuminating an interior of the vehicle, illuminating an exterior light of the vehicle, unlocking a door of the vehicle, locking a door of the vehicle, opening a trunk of the vehicle, sounding a panic alarm of the vehicle, sounding a security alarm of the vehicle, remote starting the vehicle, opening a window of the vehicle, or closing a window of the vehicle.

13. The system of claim 11, wherein the requested function is unlocking a driver's side door lock, and the control module interfaces with at least one of wiring, a computer, and a sensor in the vehicle to control the driver's side door lock.

14. The system of claim 11, wherein:

the requested function is honking a horn of the vehicle, and the control module interfaces with at least one of wiring, a computer a sensor in the vehicle to control the horn of the vehicle.

15. The system of claim 10, wherein determining the second identifier is valid comprises determining, by the first processor, the first identifier and the second identifier match.

16. The system of claim 15, wherein the first and second identifiers are one or more members selected from the group consisting of a password, a personal identification number, and a mobile-device serial number.

17. The system of claim 10, wherein the first identifier is a unique identifier specific to at least one of the user of the mobile computing device and the request to reserve the shared reservable asset.

18. The system of claim 10, wherein application running on the mobile computing device uses the location of the mobile device to identify and display one or more available reservable assets nearest to the mobile device.

19. The system of claim 10, further comprising the memory storing instructions that, when executed by the first processor, cause the first processor to:

receive, from the mobile computing device, a request for information regarding the availability of one or more shared reservable assets, wherein the shared reservable asset is one or the one or more shared reservable assets; and receive, from the reservation database, information responsive to the request for information regarding the availability of one or more shared reservable assets.

20. The system of claim 10, wherein the control module interfaces with at least one of wiring, a computer, and a sensor in the vehicle to control a driver's side door lock.

* * * * *